Inventor:
Hans Ruedi Gerber.
Attorney:

United States Patent Office 3,106,380
Patented Oct. 8, 1963

3,106,380
VALVE HAVING A REMOVABLE SEAT
Hans Ruedi Gerber, Winterthur, Switzerland, assignor to Sulzer Freres, S.A., Winterthur, Switzerland, a corporation of Switzerland
Filed Apr. 19, 1960, Ser. No. 23,298
Claims priority, application Switzerland Apr. 23, 1959
6 Claims. (Cl. 251—362)

The present invention relates to a valve having a metallic removable seat element having a surface which is pressed against a corresponding surface of a metallic valve casing by the pressure of the medium passing through the valve and by the pressure of the valve when the latter engages the seat element which is retained by a lock arrangement in the position in which said two surfaces abut against one another.

It is conventional to place the lock arrangement in a bore extending through the casing to the outside thereof at an angle to the axis of the valve spindle and the seat element and to provide means for tightening the lock arrangement against leakage. Arrangements of this type usually must be adjusted quite often because they include a relatively soft packing which is compressed when the valve is in use.

It is an object of the present invention to provide a lock arrangement having a plug member which does not need readjustment because the plug member, being made of metal and having one end engaging a suitable surface of the metallic seat element, is placed inside a closure which seals the lock arrangement against the outside of the casing. The plug abuts only against metallic parts which are fixed to the casing.

In a preferred embodiment of the invention, the plug which abuts against the seat element for retaining the latter in the desired position rests against a threaded member which is screwed into an internal thread of the valve casing. Means which are accessible from the outside of the casing are provided for rotating the threaded part for axially displacing the threaded part and the plug which is engaged by the threaded part. The plug may have a portion which is resilient in the axial direction of the plug and this portion may be abutted by the threaded part so that the plug is pressed against the seat element at a desired pressure at all operating conditions. As a modification, an axially compressible element, for example a spring washer, may be interposed between the threaded element and the plug.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Figure 1:
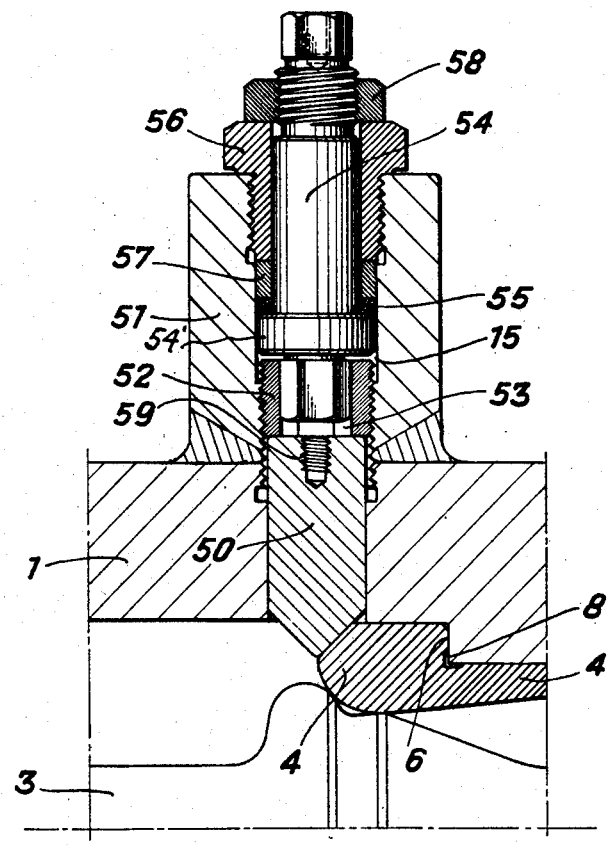
FIG. 1 is a longitudinal sectional view of a portion of a valve according to the invention.

Referring more particularly to the drawing, numeral 4 designates a seat element which has an annular shoulder 6 abutting against an annular shoulder 8 provided inside a valve casing 1. In the position shown, the seat element is engaged by a valve element 3. A bore 15 extends through the valve casing and a boss 51 forming part of the valve casing at a right angle to the axis of the seat element 4 and to the outside of the valve casing. One end of a dog or plug 50 engages a surface of the seat element 4. The other end of the plug abuts against a threaded element 52 which is screwed into a corresponding thread in the bore 15. The element 52 can be rotated for axial displacement of the element 52 and of the plug 50 by means of a bolt 54 having a hexagonal end portion extending into a corresponding hexagonal cavity 53 in the element 52. The bolt 54 extends to the outside of the valve casing so that it can be rotated while the valve is in operation. The bolt 54 is provided with a collar 54' fitting into the bore 15. A nut member 56 having a threaded part screwed into a corresponding thread in the outer portion of the bore 15 is provided with a bore through which the bolt 54 extends. The end of the threaded part of the nut member abuts against a ring 57. A packing 55 is interposed between the collar 54' and the ring 57. A washer, not shown, may be interposed between the packing 55 and the collar 54'. The closure arrangement 54 to 57 is of the type as used for tightly closing autoclaves. The closure can be tightened by means of a nut 58 screwed onto a thread on the end portion of the bolt 54 which extends outside of the valve casing. The collar of the bolt 54 is pressed against the packing 55 not only by the pressure inside the valve but also by the pressure produced by tightening the nut 58. The pressure inside the valve presses the collar 54' against the packing 55 also when the nut 58 is not fully tightened. The plug 50 is preferably provided with a threaded bore 59 into which a tool may be screwed for pulling the plug out of the casing after removal of the autoclave closure when it is desired to remove or exchange the plug.

Figure 2:
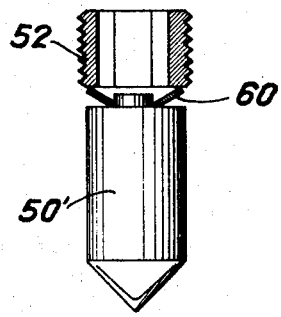
FIG. 2 is a part sectional side elevation of a modified detail of the valve shown in FIG. 1.

Whereas in the arrangement shown in FIG. 1 the plug 50 is rigidly associated with the threaded element 52, in the modification shown in FIG. 2 a resilient element, namely, a spring washer 60 is interposed between a plug 50' and the threaded element 52.

Figure 3:
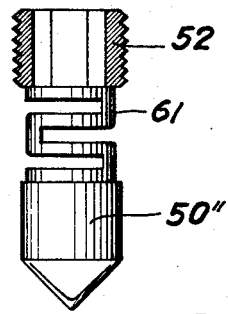
FIG. 3 is a part sectional side elevation of another modification of a detail of the valve shown in FIG. 1.

In the modification shown in FIG. 3, the plug 50'' has an axially resilient portion 61 abutting against the threaded element 52.

The arrangement according to the invention is of particular advantage if used in connection with valves whose removable metallic seat has a surface which is in direct contact with a corresponding metallic surface of the valve casing, i.e., in valves in which there is no deformable packing interposed between the seat element and the valve casing.

I claim:

1. A valve comprising a casing having a passageway therein and an internal annular shoulder encircling said passageway, a removable seat means in said casing having an annular surface abutting against the internal shoulder of said casing, said casing having a substantially transverse bore extending between said passageway and the outside of said casing, a plug slidably received in said bore with the inner end thereof abutting against said seat means for pressing said seat means against the shoulder in said casing, said bore having an internally threaded portion extending beyond the outer end of said plug, a separate externally threaded plug-adjusting element screwed into the threaded portion of said bore and abutting against the outer end of said plug to press said plug against said seat means to retain the seat means firmly engaged with said shoulder, and closure means outwardly of and separate from said plug-adjusting element for closing said bore, said closure means including actuating means having an inner end axially slidably engaging said threaded plug-adjusting element for rotating the latter to effect axial adjustment of the position of said plug-adjusting element in said bore for locking said plug in position to retain the seat means against said shoulder, said closure means including seal means placed within said bore and being independent of said plug-adjusting element and of said plug and unaffected by the locking action of said plug-adjusting element on said plug.

2. A valve as defined in claim 1 including resilient means interposed between said plug and said plug adjusting element.

3. A valve according to claim 2 wherein said resilient means is in the form of a spring washer.

4. A valve according to claim 2 wherein said resilient means forms a part of said plug.

5. A valve according to claim 1 wherein said actuating means is in the form of a bolt extending to the outside of said casing.

6. A valve according to claim 5 wherein said closure means includes a thread in the outer end of said bore, a nut member having a bore and an externally threaded portion screwed in said thread in the outer end of said bore, said bolt having a collar fitting in said bore, said seal means being interposed between said collar and said nut member, said bolt extending through said bore in said nut member and having a threaded portion outside of said nut member, and a nut screwed onto said last mentioned threaded portion and abutting against said nut member for compressing said seal means between said collar and said nut member upon tightening of said nut.

References Cited in the file of this patent

UNITED STATES PATENTS

| | | |
|---|---|---|
| 1,653,619 | Brown | Dec. 27, 1927 |
| 1,865,458 | Degnan | July 5, 1932 |
| 2,738,799 | Mueller | Mar. 20, 1956 |
| 2,777,664 | Bryant | Jan. 15, 1957 |

FOREIGN PATENTS

| | | |
|---|---|---|
| 9,713 | Great Britain | of 1901 |
| 24,254 | Great Britain | of 1903 |
| 472,500 | Italy | June 20, 1952 |
| 813,059 | Great Britain | of 1959 |